Sept. 12, 1933.  A. F. KUESTER  1,926,238

TRAILER HITCH

Filed Nov. 7, 1930

Inventor
August F. Kuester
By
Attorneys

UNITED STATES PATENT OFFICE 1,926,238

TRAILER HITCH

August F. Kuester, Clintonville, Wis.

Application November 7, 1930. Serial No. 494,032

5 Claims. (Cl. 280—33.44)

This invention relates to a new and improved type of trailer hitch.

One of the objects of the present invention is the provision of an improved type of trailer hitch wherein the traction power and the trailer are connected together in such a manner as to permit tilting of the trailer to loading position and still maintain the connection between the traction power and the trailer, which assures positive connection of the trailer with the traction power at all times.

Another object of the present invention is the provision of a trailer hitch including a connecting bar permanently connected to the trailer and a channel member hingedly connected to the connecting bar and adapted to be detachably connected with the traction power, together with means for detachably connecting the connecting bar and channel member at a point between the connection to the traction means and the hinge connection, so that the connecting bar can be released when it is desired to permit the trailer to be moved to an inclined position for loading purposes, but at the same time cause the connecting bar to assume its operative connecting position as soon as the trailer has been loaded, the channel bar guiding the connecting bar to its operative position.

A further object of the present invention is the provision of an improved type of hitch used for connecting any suitable type of traction power to the trailer whereby a permanent connection can be maintained between the traction power and the trailer which will permit tilting movement of the trailer without severing the connection between the trailer and the traction power, so that there will be a positive connection between these parts at all times.

With the above and other objects in view, the invention consists in the novel features of construction, the combination and arrangement of parts hereinafter more fully set forth, pointed out in the claims and shown in the accompanying drawing wherein:

Figure 1:
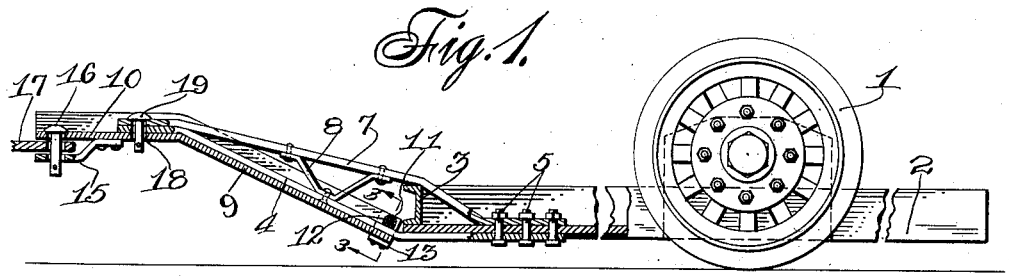
Figure 1 is a side elevation of a portion of the trailer illustrating my improved trailer hitch applied thereto and in operative position, with parts thereof broken away and illustrated in cross section.

The improved trailer hitch illustrated in the accompanying drawing is particularly adapted for use with trailers of that type illustrated in a co-pending application filed by me on April 7, 1930, for Trailers, which bears Serial #442,167, as this type of hitch permits the trailer body to be moved to a tilted or inclined position so that a comparatively heavy load can be moved onto the trailer body or platform, with comparative ease, but still maintain the permanent connection between the traction means and the trailer.

In the accompanying drawing, I have illustrated a portion of the trailer which includes the traction wheels 1 having suspended therefrom the trailer body or platform 2 provided at its forward end with a channel bar 3 extending transversely of the body. The connecting bar which is permanently connected to the trailer body includes the lower bar 4 which has its inner end arranged parallel with the bottom of the trailer and extended along the bottom from the front end thereof and connected to the bottom of the trailer by means of the bolts 5. The bar 4 extending from the body of the trailer is preferably disposed on an incline, as illustrated with the outer end 6 offset and provided with a transverse opening.

The upper part 7 of the connecting bar attached to the trailer has its inner end connected to the upper face of the body or platform 2 by means of the bolts 5, and this part 7 extends upwardly over the upper side of the channel bar 3 and then slightly inclined in a substantially parallel plane with the bar 4, and has its outer end disposed in intimate contact with the offset end 6 and provided with an opening to correspond with the opening in the outer end of bar 4.

The two members 4 and 7 having their inner ends rigidly secured to the body of the trailer with their intermediate portions in substantially parallel relation, and their outer ends in intimate engagement, form the usual connecting bar for the trailer, and these members are braced to retain them against movement relative to each other by means of the substantially V-shaped brace member 8, the intermediate portion of which is connected to the member 4, while the ends are connected to the member 7 at spaced points.

Figure 3:
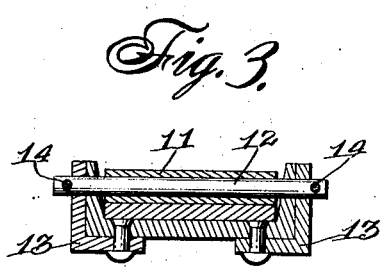
Figure 3 is a transverse section on the line 3—3 of Figure 1.

An auxiliary member is used in this improved hitch and in the present instance, is shown as a channel member having an inclined portion 9 and a substantially horizontal portion 10. The lower end of the inclined portion 9 receives the main connecting bar and carried by the member 4 of this main connecting bar is a bearing sleeve 11. The side walls of the channel member at the lower end of the inclined portion 9 are provided with aligned openings adapted to be positioned in alignment with the bore of the tubular member 11 to receive a hinge pin 12. The sides of the lower end of the channel member are preferably braced by the angular pieces 13 arranged at each side of the channel member, as shown in Figure 3, and the vertical portions of these angular braces are provided with openings to align with the openings in the side walls of the channel to receive the ends of the hinge pin 12. The hinge pin 12 is retained in position by means of the small cross pins 14 extending transversely through the ends of the hinge pin.

The horizontal portion of the channel bar has attached thereto an arm 15, one end of which is arranged in spaced relation with the bottom of the channel member and provided with an opening adapted to align with a similar opening in the bottom of the channel member adjacent the outer end thereof for receiving the connecting pin 16. The connecting pin 16 passes through the perforated draw bar 17 of the traction means, thus permanently connecting the channel member with the draw bar 17. A cotter pin or the like can be passed transversely through the lower end of pin 16 to retain the same in locking position.

Figure 2:
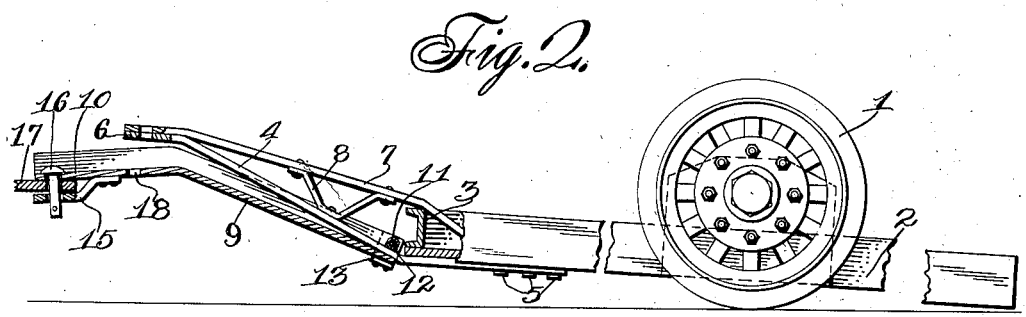
Figure 2 is a similar view showing the connecting bar in a detached position and the trailer in an inclined loading position.

A horizontal portion of the channel member is provided adjacent its outer end with an opening 18 and this opening is formed in the channel member so that when the connecting bar is in in a lowered operative position, as shown in Figure 1, the openings in the outer ends of members 4 and 7 will align with this opening 18 to receive a connecting pin 19 which may be retained in locking position by means of a cotter pin or the like, passed through the lower end thereof. It will be apparent from the foregoing that at all times the member 4 is positioned between the side walls of the channel member, particularly the inclined portion 9 thereof, as shown in both Figures 1 and 2.

In Figure 1, it will be noted that the trailer is connected up with the draw bar 17 of the traction power, and that both the permanent and auxiliary members are in operative position to provide a direct connection between the trailer and the traction means. However, when it is desired to position the trailer in an inclined position for loading purposes so that the rear end of the trailer can be rested upon the ground or traction surface, the pin 19 is removed permitting the outer end of the permanent bar to rise upwardly to the position shown in Figure 2. This will permit the trailer to readily assume an inclined loading position, but still maintain a permanent connection between the trailer and traction means which will save considerable time in providing for the proper connection between the trailer and the traction means.

It will be noted that by having the lower member 4 at all times positioned within the channel member, the outer end of the permanent draw bar connected to the trailer will be readily guided to a position for aligning the openings therein with the opening 18, so that the pin 19 can be quickly placed in position to provide for proper connection between the trailer and the traction means. It will be noted that the hinge connection between the auxiliary draw bar which is in the form of a channel bar and the permanently connected draw bar, permits the permanent bar to move to an inclined position when the trailer is tilted relative to the auxiliary bar, but is still in such a position that when the trailer is returned to its normal horizontal position, the permanent bar can be readily connected to the auxiliary bar in a great saving of time.

Figure 4:
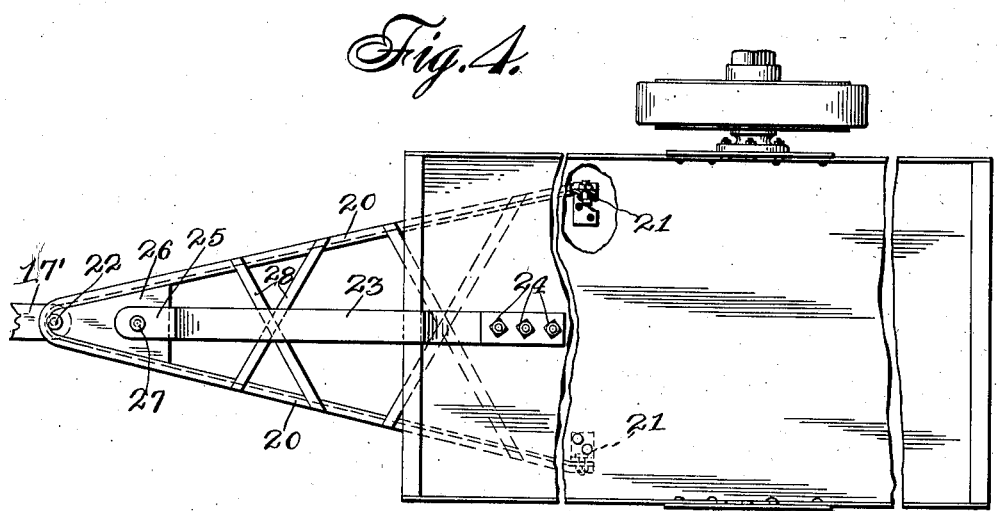
Figure 4 is a top plan view of the trailer illustrating the application of a modified form of trailer hitch with parts thereof illustrated in cross section.

In Figure 4, I have illustrated a slightly modified form of the invention wherein the divergent bars 20 are connected at their inner ends to the bottom of the trailer, as shown at 21, and the forward ends are permanently connected to the draw bar 17' by means of the pin 22. The permanent draw bar 23 is permanently connected to the bottom of the trailer body by means of bolts 24, while the outer end thereof is laterally offset to form a substantially horizontal portion 25 provided with a bolt receiving opening.

Arranged between the outer ends of the bars 20 is a plate 26 having an opening adapted to be aligned with the opening in the lateral offset portion 25 when in operative position, as shown in Figure 4, to receive the connecting pin 27.

In this form of the invention, it will be noted that when it is desired to tilt the platform of the trailer for loading purposes, the pin 27 is removed permitting the permanent bar 23 to be moved upwardly away from the plate 26, but still maintaining the connection between the divergent bars 20, the trailer and the connecting bar 17', so that the trailer is at all times provided with a permanent connection to the traction means.

As shown in Figure 4, the divergent bars are retained against spreading movement by means of cross braces.

It will be apparent from the foregoing that I have provided a simple and inexpensive trailer hitch, whereby the type of trailer illustrated in my co-pending application filed April 7, 1930, Serial #442,167, is provided, whereby to permit the trailer to be disposed on an inclined plane for loading purposes, but at the same time retain a permanent connection between the trailer and the traction means. The device also provides means whereby the permanent connecting bar carried by the trailer can be quickly and easily detached from the auxiliary connecting bar carried by the traction means to provide for a considerable saving of time.

Attention is directed to the fact that by providing the auxiliary bar in channel form, the side walls thereof will always guide the outer end of the traction connecting bar into position to be quickly connected with the auxiliary channel bar so that the pin 19 can be quickly inserted in place for connecting the traction and auxiliary bar.

I claim:

1. A tractor hitch including an auxiliary connecting bar, means for attaching said bar to traction means, a second bar permanently connected at one end to a trailer, means for pivotally connecting the auxiliary bar to the second bar, and means for providing a detachable connection between the outer end of the second bar and the auxiliary bar at a point adjacent its connection with the traction means said bars acting as a brace for one another when the same are connected.

2. A trailer hitch including a connecting bar permanently connected with a trailer, an auxiliary connecting bar pivotally connected with the first bar, means for connecting the auxiliary bar to traction power, and means for providing a detachable connection between said bars at a point remote from the hinge connection and adjacent to the point of connection of the first bar with the trailer, said bars acting as a brace for one another when the same are connected.

3. In combination with a trailer and traction means therefor, of means forming connection between the trailer and traction means including hingedly connected bars, means for connecting one of said bars to the trailer, means for connecting the other bar to the traction means, and means for detachably connecting said bars at a point remote from the hinge connection and adjacent to the point of connection of the mentioned bar to the trailer, said bars acting as a brace for one another when the same are connected.

4. A trailer hitch including a connecting bar having one end permanently connected to a trailer, an auxiliary bar having one end pivotally connected to the first bar at a point remote from its outer end, means for connecting the other end of the auxiliary bar with traction means, and means for detachably connecting the outer end of the first bar with the second bar at a point adjacent the outer end of the second bar, said bars acting as a brace for one another when the same are connected.

5. A device for connecting a trailer to a leading vehicle comprising a pair of normally parallel drawing bars, means pivotally connecting one of said bars to the trailer, means rigidly connecting the other bar to the trailer, coupling means carried by the outer end of one bar for engagement with the leading vehicle, and means detachably connecting the outer end of the other bar to the last mentioned bar in close proximity to the coupling said rigidly secured bar acting as a brace for the pivotally mounted bar substantially throughout its entire length when said bars are connected.

AUGUST F. KUESTER.